US011847152B2

(12) United States Patent
Zhang et al.

(10) Patent No.: US 11,847,152 B2
(45) Date of Patent: Dec. 19, 2023

(54) PATENT EVALUATION METHOD AND SYSTEM THAT AGGREGATE PATENTS BASED ON TECHNICAL CLUSTERING

(71) Applicants: BEIJING INNOVATOR INFORMATION TECHNOLOGY CO., LTD., Beijing (CN); BEIJING BENYING TECHNOLOGIES CO., LTD, Beijing (CN); BEIJING Z-PARK TECHINA INTELLECTUAL PROPERTY SERVICES GROUP, Beijing (CN)

(72) Inventors: Minyue Zhang, Beijing (CN); Kai Cao, Beijing (CN); Yudan Lv, Beijing (CN); Weining Li, Beijing (CN); Yulin Zhou, Beijing (CN); Jiantao Li, Beijing (CN); Yi Lin, Beijing (CN)

(73) Assignees: BEIJING INNOVATOR INFORMATION TECHNOLOGY CO., LTD., Beijing (CN); BEIJING BENYING TECHNOLOGIES CO., LTD, Beijing (CN); BEIJING Z-PARK TECHINA INTELLECTUAL PROPERTY SERVICES, Beijing (CN)

( * ) Notice: Subject to any disclaimer, the term of this patent is extended or adjusted under 35 U.S.C. 154(b) by 228 days.

(21) Appl. No.: 17/381,209

(22) Filed: Jul. 21, 2021

(65) Prior Publication Data
US 2021/0349928 A1 Nov. 11, 2021

Related U.S. Application Data

(63) Continuation of application No. PCT/CN2020/073106, filed on Jan. 20, 2020.

(30) Foreign Application Priority Data

Jan. 25, 2019 (CN) .......................... 201910075167.7

(51) Int. Cl.
*G06F 18/2323* (2023.01)
*G06F 40/279* (2020.01)
(Continued)

(52) U.S. Cl.
CPC .......... *G06F 16/353* (2019.01); *G06F 40/216* (2020.01); *G06F 40/284* (2020.01); *G06N 5/02* (2013.01)

(58) Field of Classification Search
CPC ...... G06F 16/285; G06F 16/35; G06F 16/355; G06F 16/906; G06F 18/23;
(Continued)

(56) References Cited

U.S. PATENT DOCUMENTS 7,945,600 B1 * 5/2011 Thomas ................. G06F 16/353
707/804
10,191,973 B1 * 1/2019 Bent ....................... G06F 16/35
(Continued)

FOREIGN PATENT DOCUMENTS

CN 103164540 A 6/2013
CN 104881401 A 9/2015
(Continued)

OTHER PUBLICATIONS

Wikipedia, "Spectral clustering", 7 pages, downloaded May 25, 2023. (Year: 2023).*

*Primary Examiner* — Martin Lerner
(74) *Attorney, Agent, or Firm* — Bayramoglu Law Offices LLC

(57) ABSTRACT

A patent evaluation method and system thereof are provided. The method includes collecting patent documents, and fur-
(Continued)

ther includes the following steps: generating technical points and patent-affiliated technical points; generating technical clusters and patent-affiliated cluster; performing a patent evaluation in each of the technical clusters. The patent evaluation method and system proposed in the present invention aggregates the patents in a technical cluster mode through natural language processing and complex network algorithms, gives patents scientific and technological attributes, and places the patents in a global same industry for evaluation.

7 Claims, 8 Drawing Sheets

(51) Int. Cl.
*G06F 16/35* (2019.01)
*G06F 40/284* (2020.01)
*G06F 40/216* (2020.01)
*G06N 5/02* (2023.01)

(58) Field of Classification Search
CPC .. G06F 18/2323; G06F 40/279; G06F 40/284; G06F 16/353; G06F 40/289; G06F 40/30; G06F 40/35
USPC ............ 704/1, 9; 706/12; 707/737; 705/310
See application file for complete search history.

(56) References Cited

U.S. PATENT DOCUMENTS

| | | | |
|---|---|---|---|
| 2004/0181427 A1* | 9/2004 | Stobbs | G06F 40/30 705/310 |
| 2006/0212480 A1* | 9/2006 | Lundberg | G06Q 10/10 |
| 2007/0208669 A1* | 9/2007 | Rivette | G06F 40/117 705/310 |
| 2008/0195568 A1* | 8/2008 | Chen | G06F 16/353 706/50 |
| 2008/0243829 A1 | 10/2008 | Liu et al. | |
| 2008/0294658 A1* | 11/2008 | Lin | G06F 16/358 |
| 2008/0294686 A1* | 11/2008 | Long | G06F 18/2323 |
| 2011/0161089 A1* | 6/2011 | Kuan | G06F 16/35 707/769 |
| 2011/0202886 A1* | 8/2011 | Deolalikar | G06F 16/353 715/853 |
| 2013/0054603 A1* | 2/2013 | Birdwell | G06F 18/2323 707/738 |
| 2013/0086047 A1* | 4/2013 | Lundberg | G06F 40/237 707/722 |
| 2013/0086049 A1* | 4/2013 | Lundberg | G06F 40/237 707/722 |
| 2013/0086084 A1* | 4/2013 | Lundberg | G06F 40/237 707/749 |
| 2018/0232215 A1* | 8/2018 | Campbell, Jr. | G06F 16/353 |
| 2020/0175626 A1* | 6/2020 | Bharti | G06F 17/16 |
| 2021/0241331 A1* | 8/2021 | Katzenelson | G06F 40/268 |
| 2022/0374473 A1* | 11/2022 | He | G06F 16/93 |

FOREIGN PATENT DOCUMENTS

| | | |
|---|---|---|
| CN | 105824904 A | 8/2016 |
| CN | 107544957 A | 1/2018 |
| CN | 107832412 A | 3/2018 |
| CN | 108090049 A | 5/2018 |
| JP | 2005032136 A | 2/2005 |

* cited by examiner

US 11,847,152 B2

PATENT EVALUATION METHOD AND SYSTEM THAT AGGREGATE PATENTS BASED ON TECHNICAL CLUSTERING

CROSS REFERENCE TO THE RELATED APPLICATIONS

This application is continuation application of International Application No. PCT/CN2020/073106, filed on Jan. 20, 2020, which is based upon and claims priority to Chinese Patent Application No. 201910075167.7, filed on Jan. 25, 2019, the entire contents of which are incorporated herein by reference.

TECHNICAL FIELD

The invention relates to the technical field of network monitoring, in particular to a patent evaluation method and system.

BACKGROUND

With the increasing development of science and technology, companies are paying more and more attention to their own intellectual property protection, and the number and quality of patent applications have also been greatly increased, at this stage, several patent management platforms have been developed, but these patent management platforms are only applicable to the payment period of patents and the current review stage and cannot evaluate value of patents.

It is well known that accurate and effective value evaluation of existing patent documents can guide the development work of technical personnel and shorten the development time of the project, therefore, it is very promising to develop a patent evaluation system for technical personnel to use.

The invention patent with publication number CN 103164540A discloses a patent hot spot discovery and trend analysis method. During the patent hot spot discovery, first, word segmentation is executed, and a similarity between patent documents is calculated, and clustering is executed based on the similarity. Then, phrases in each cluster are merged to make the result more concise and intuitive. Then, a hot spot technology is discovered through a hot spot calculation method, and hot spot degree of each hot spot technology is analyzed. Finally, curve fitting is executed according to historical data, and a current life cycle of a certain technology is judged by means of Logistic regression curve, so as to analyze development status and potential research value of the technology. At the same time, an effective trend analysis of a hot technology is executed to give the future development trend of this technology. The disadvantage of this method is that it only evaluates patents from technical hot pots and has a single dimension, which makes it difficult to reflect the value of patents in other aspects.

SUMMARY

In order to solve the above-mentioned technical problems, the present invention proposes a patent evaluation method and system, which aggregates the patents in a technical cluster mode through natural language processing and complex network algorithms, gives patents scientific and technological attributes, and places the patents in a global same industry for evaluation.

The first object of the present invention is to provide a patent evaluation method, including collecting patent documents, and further including the following steps:

step 1: generating technical points and patent-affiliated technical points;
step 2: generating technical clusters and patent-affiliated clusters;
step 3: performing a patent evaluation in each of the technical clusters.

Preferably, the step 1 includes the following sub-steps:
step 11: constructing a collection of patent documents;
step 12: generating lexical items of each patent;
step 13: summarizing the lexical items and calculating a word vector of each of the lexical items;
step 14: determining a word vector of a node in an existing knowledge graph according to word vectors, and calculating a similarity between connected word vectors to generate an undirected weighted graph G;
step 15: using spectral clustering to generate clusters which are the technical points according to the undirected weighted graph G;
step 16: calculating an average word vector of each technical point according to the lexical items and the word vectors;
step 17: selecting the most frequent T numbers of lexical items from the lexical items as patent keywords, and using the word vectors to calculate an average word vector of each patent keyword;
step 18: calculating a cosine similarity between the average word vector of the technical point and the average word vector of the patent keyword.

In any of the above solutions, preferably, an implementation method of the step 12 is to define the collection of patent documents as $C=\{C_1, C_2, \ldots, C_n\}$, any patent Ci in the collection of patent documents C is represented by a space vector of a set of keywords.

In any of the above solutions, preferably, a process of the implementation method is to first use an existing word segmentation system to perform Chinese word segmentation on all the patent documents to obtain the lexical items; and then to remove stop words in the patent documents according to a custom or public stop word database, wherein the stop words are function words without actual meanings.

In any of the above solutions, preferably, an implementation method of the step 13 is to predict an occurrence probability of a current word according to words in context, and a learning goal is to maximize a log-likelihood function, $$L = \sum_{\omega \in C} \log p(\omega \mid \text{Context}(\omega))$$

wherein ω represents any word in the patent documents C, p represents probability, p(ω|Context(ω)) represents probability under the Context(ω), and Context represents a context of the word.

In any of the above solutions, preferably, an iteration formula of the word vector of each word is as follows:

$$v(\tilde{\omega}) := v(\tilde{\omega}) + \eta \sum_{j=2}^{\mu} \frac{\partial L(\omega, j)}{\partial x_\omega}, \tilde{\omega} \in \text{Context}(\omega)$$

wherein x represents a word vector added by all of the word vectors of the word in the context, η represents a learning rate, $l^\omega$ represents the number of nodes, $\partial$ represents a partial derivative, $x_\omega$ represents an input of an input layer.

$$v(\tilde{\omega}) := v(\tilde{\omega}) + \eta \sum_{j=2}^{\omega} \frac{\partial L(\omega, j)}{\partial x_\omega}, \tilde{\omega} \in \text{Context}(\omega)$$

In any of the above solutions, preferably, the step 14 further comprises calculating a cosine similarity between connected nodes.

In any of the above solutions, preferably, a calculation formula of the cosine similarity is $$\cos(\theta) = \frac{\sum_{i=1}^{n}(x_i \times y_i)}{\sqrt{\sum_{i=1}^{n}(x_i)^2} \times \sqrt{\sum_{i=1}^{n}(y_i)^2}}$$

wherein $x_i$, $y_i$ are the i-th element of the word vectors respectively, and n is a dimension of the word vector.

In any of the above solutions, preferably, a calculation method of the technical points is as follows:
   step 151: generating an adjacency matrix W of the graph G, where W is a symmetric matrix, and diagonal elements are 0;
   step 152: normalizing to generate a Laplacian matrix;
   step 153: generating the smallest k eigenvalues and corresponding eigenvectors of L;
   step 154: taking each row of the eigenvectors as a sample point, and clustering the sample point by using the k-means method to obtain cluster divisions.

In any of the above solutions, preferably, the Laplacian matrix L=D−W satisfies $$L_{ij} = \begin{cases} \sum_{j=1}^{n} \omega_{ij} & i = j \\ -\omega_{ij} & i \neq j \end{cases}$$

wherein D is a diagonal matrix whose diagonal elements $d_i$ are a sum of elements of W rows or columns, $L_{ij}$ is an element in L, $\omega_{ij}$ is an element in W.

In any of the above solutions, preferably, the step 2 comprises the following sub-steps:
   step 21: counting the number of patents in common between any two technical points;
   step 22: generating a complex network by taking the technical point as a point and the number of patents in common as an edge;
   step 23: generating the technical clusters.

In any of the above solutions, preferably, the step 3 comprises the following sub-steps:
   step 31: segmenting each patent text in the clusters and removing the stop words;
   step 32: generating the word vectors of each patent;
   step 33: using the cosine similarity to calculate a similarity between any two patents in the clusters;
   step 34: generating a complex network by taking the patent as a point and the similarity as an edge;
   step 35: calculating a TextRank value of each patent.

In any of the above solutions, preferably, the step 32 comprises the following sub-steps:
   step 321: generating lexical items of each patent;
   step 322: summarizing the lexical items, and calculating the word vector of each lexical item;
   step 323: introducing patent documents id into a training corpus for training.

In any of the above solutions, preferably, a method of the training comprises:
   step A: initializing each patent document id and all the lexical items to form a K-dimensional vector;
   step B: inputting the K-dimensional vector and the word vectors into a model, and accumulating these vectors by a hidden layer to obtain an intermediate vector as an input of an output layer softmax.

In any of the above solutions, preferably, formulae of the training are $$f_t = \sigma_g(W_f x_t + U_f h_{t-1} + b_f)$$
$$i_t = \sigma_g(W_i x_t + U_i h_{t-1} + b_i)$$
$$o_t = \sigma_g(W_o x_t + U_o h_{t-1} + b_o)$$
$$c_t = f_t \circ c_{t-1} + i_t \circ \sigma_c(W_c x_t + U_c h_{t-1} + b_c)$$
$$h_t = o_t \circ \sigma_h(c_t)$$

wherein, f represents a forgotten activation vector, $\sigma_g$ is a sigmoid function, W, U and b are weight matrixes and deviation vector parameters that need to be learned during the training, x is an input vector of LSTM unit, t represents a time step, h represents an output vector of the LSTM unit, and i represents an activation vector of an input gate; o represents an activation vector of an output gate, c represents a cell state vector, $\sigma_c$ and $\sigma_h$ are hyperbolic tangent functions.

In any of the above solutions, preferably, an iteration formula of the TextRank value is $$WS(V_i) = (1-d) + d \times \sum_{V_k \in In(V_i)} \frac{\omega_{ij}}{\sum_{V_k \in Out(V_j)} \omega_{jk}} WS(V_j)$$

wherein, $V_i$ and $V_j$ represent certain patents, $WS(V_i)$ represents a TextRank value of the patent $V_i$, d represents a damping coefficient, $\ln(V_i)$ represents a collection of patents which point to the patent $V_i$, $Out(V_j)$ represents a collection of patents which the patent $V_j$ pointed to, $WS(V_j)$ represents a TextRank value of the patent $V_j$.

The second object of the present invention is to provide a patent evaluation system, which includes a collection module for collecting patent documents, and further includes the following modules:
   a technical point generating module, configured for generating technical points and patent-affiliated technical points;
   a cluster generating module, configured for generating technical clusters and patent-affiliated clusters;
   a patent evaluation module, configured for performing a patent evaluation in each of the technical clusters.

In any of the above solutions, preferably, work of the technical point generating module comprises the following sub-steps:
   step 11: constructing a collection of patent documents;
   step 12: generating lexical items of each patent;
   step 13: summarizing the lexical items and calculating a word vector of each of the lexical items;

step 14: determining a word vector of a node in an existing knowledge graph according to word vectors, and calculating a similarity between connected word vectors to generate an undirected weighted graph G;

step 15: using spectral clustering to generate clusters which are the technical points according to the undirected weighted graph G;

step 16: calculating an average word vector of each technical point according to the lexical items and the word vectors;

step 17: selecting the most frequent T numbers of lexical items from the lexical items as patent keywords, and using the word vectors to calculate an average word vector of each patent keyword;

step 18: calculating a cosine similarity between the average word vector of the technical point and the average word vector of the patent keyword.

In any of the above solutions, preferably, an implementation method of the step 12 is to define the collection of patent documents as $C=\{C_1, C_2, \ldots, C_n\}$, any patent Ci in the collection of patent documents C is represented by a space vector of a set of keywords.

In any of the above solutions, preferably, a process of the implementation method is to first use an existing word segmentation system to perform Chinese word segmentation on all the patent documents to obtain the lexical items; and then to remove stop words in the patent documents according to a custom or public stop word database, wherein the stop words are function words without actual meanings.

In any of the above solutions, preferably, an implementation method of the step 13 is to predict an occurrence probability of a current word according to words in context, and a learning goal is to maximize a log-likelihood function, $$L = \sum_{\omega \in C} \log p(\omega \mid \text{Context}(\omega))$$

wherein $\omega$ represents any word in the patent documents C, p represents probability, $p(\omega|\text{Context}(\omega))$ represents probability under the Context($\omega$), and Context represents a context of the word.

In any of the above solutions, preferably, characterized in that, an iteration formula of the word vector of each word is as follow:

$$v(\tilde{\omega}) := v(\tilde{\omega}) + \eta \sum_{j=2}^{l^\omega} \frac{\partial L(\omega, j)}{\partial x_\omega}, \tilde{\omega} \in \text{Context}(\omega)$$

wherein x represents a word vector added by all of the word vectors of the word in the context, $\eta$ represents a learning rate, $l^\omega$ represents the number of nodes, $\partial$ represents a partial derivative, $x_\omega$ represents an input of an input layer.

In any of the above solutions, preferably, the step 14 further comprises calculating a cosine similarity between connected nodes.

In any of the above solutions, preferably, a calculation formula of the cosine similarity is $$\cos(\theta) = \frac{\sum_{i=1}^n (x_i \times y_i)}{\sqrt{\sum_{i=1}^n (x_i)^2} \times \sqrt{\sum_{i=1}^n (y_i)^2}}$$

wherein $x_i$, $y_i$ are the i-th element of two word vectors respectively, and n is a dimension of the word vector.

In any of the above solutions, preferably, a calculation method of the technical points is as follows:

step 151: generating an adjacency matrix W of the graph G, where W is a symmetric matrix, and diagonal elements are 0;

step 152: normalizing to generate a Laplacian matrix;

step 153: generating the smallest k eigenvalues and corresponding eigenvectors of L;

step 154: taking each row of the eigenvectors as a sample point, and clustering the sample point by using the k-means method to obtain cluster divisions.

In any of the above solutions, preferably, the Laplacian matrix $L=D-W$ satisfies $$L_{ij} = \begin{cases} \sum_{j=1}^n \omega_{ij} & i = j \\ -\omega_{ij} & i \neq j \end{cases}$$

wherein D is a diagonal matrix whose diagonal elements $d_i$ are a sum of elements of W rows or columns, $L_{ij}$ is an element in L, $\omega_{ij}$ is an element in W.

In any of the above solutions, preferably, work of the cluster generating module comprises the following sub-steps:

step 21: counting the number of patents in common between any two technical points;

step 22: generating a complex network by taking the technical point as a point and the number of patents in common as an edge;

step 23: generating the technical clusters.

In any of the above solutions, preferably, work of the patent evaluation module comprises the following sub-steps:

step 31: segmenting each patent text in the clusters and removing the stop words;

step 32: generating the word vectors of each patent;

step 33: using the cosine similarity to calculate a similarity between any two patents in the clusters;

step 34: generating a complex network by taking the patent as a point and the similarity as an edge;

step 35: calculating a TextRank value of each patent.

In any of the above solutions, preferably, the step 32 comprises the following sub-steps:

step 321: generating lexical items of each patent;

step 322: summarizing the lexical items, and calculating the word vector of each lexical item;

step 323: introducing patent documents id into a training corpus for training.

In any of the above solutions, preferably, a method of the training comprises:

step A: initializing each patent document id and all the lexical items to form a K-dimensional vector;

step B: inputting the K-dimensional vector and the word vectors into a model, and accumulating these vectors by a hidden layer to obtain an intermediate vector as an input of an output layer softmax.

In any of the above solutions, preferably, formulae of the training are $$f_t = \sigma_g(W_f x_t + U_f h_{t-1} + b_f)$$

-continued $$i_t = \sigma_g(W_i x_t + U_i h_{t-1} + b_i)$$

$$o_t = \sigma_g(W_o x_t + U_o h_{t-1} + b_o)$$

$$c_t = f_t \circ c_{t-1} + i_t \circ \sigma_c(W_c x_t + U_c h_{t-1} + b_c)$$

$$h_t = o_t \circ \sigma_h(c_t)$$

wherein, f represents a forgotten activation vector, $\sigma_g$ is a sigmoid function, W, U and b are weight matrixes and deviation vector parameters that need to be learned during the training, x is an input vector of LSTM unit, t represents a time step, h represents an output vector of the LSTM unit, and i represents an activation vector of an input gate; o represents an activation vector of an output gate, c represents a cell state vector, $\sigma_c$ and $\sigma_h$ are hyperbolic tangent functions.

In any of the above solutions, preferably, an iteration formula of the TextRank value is $$WS(V_i) = (1-d) + d \times \sum_{V_k \in In(V_i)} \frac{\omega_{ij}}{\sum_{V_k \in Out(V_i)} \omega_{jk}} WS(V_j)$$

wherein, $V_i$ and $V_j$ represent certain patents, $WS(V_i)$ represents a TextRank value of the patent $V_i$, d represents a damping coefficient, $In(V_i)$ represents a collection of patents which point to the patent $V_i$, $Out(V_j)$ represents a collection of patents which the patent $V_j$ pointed to, $WS(V_j)$ represents a TextRank value of the patent $V_j$.

The present invention proposes a patent evaluation method and system, which compares patents with technologies in the global same industry, can objectively evaluate the depth and breadth of patented technologies, and predict the expected life of patents, and judge the strength of R&D personnel.

DETAILED DESCRIPTION OF THE EMBODIMENTS

The present invention will be further described below in conjunction with the drawings and specific embodiments.

Embodiment 1

Figure 1:
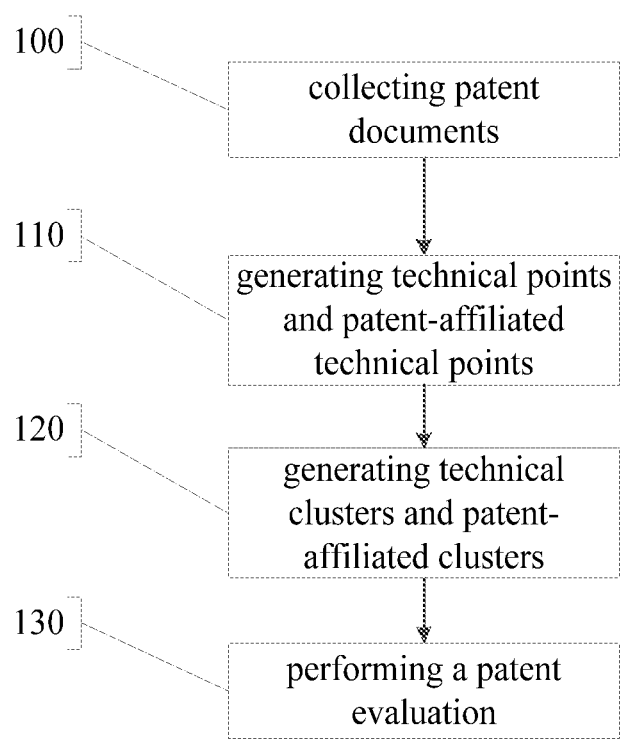
FIG. 1 is a flowchart of a preferred embodiment of the patent evaluation method according to the present invention.
Figure 2:
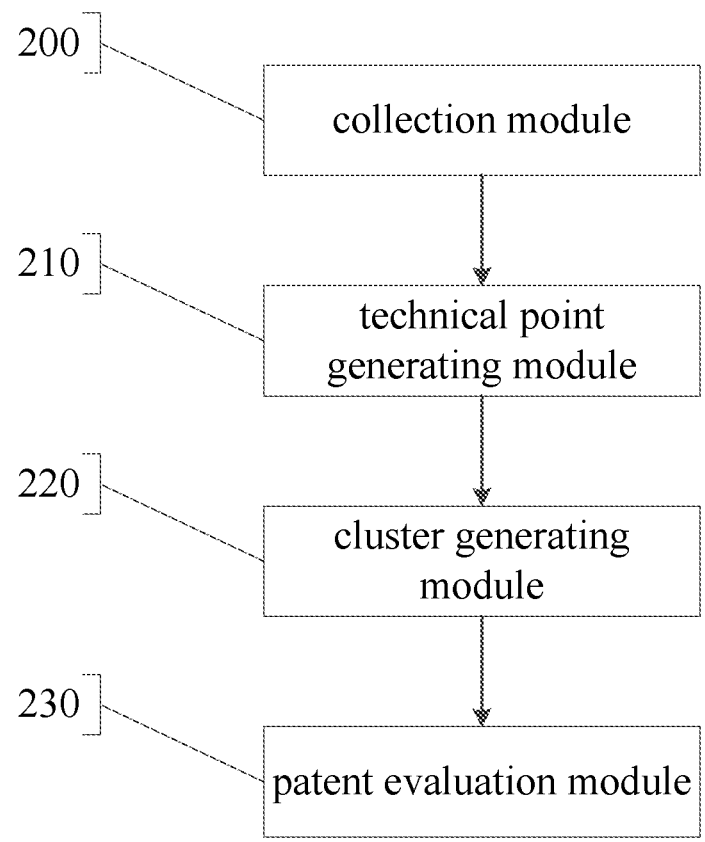
FIG. 2 is a block diagram of a preferred embodiment of the patent evaluation system according to the present invention.

As shown in FIG. 1 and FIG. 2, step 100 is executed, and a collection module 200 collects patent documents.

Figure 1A:
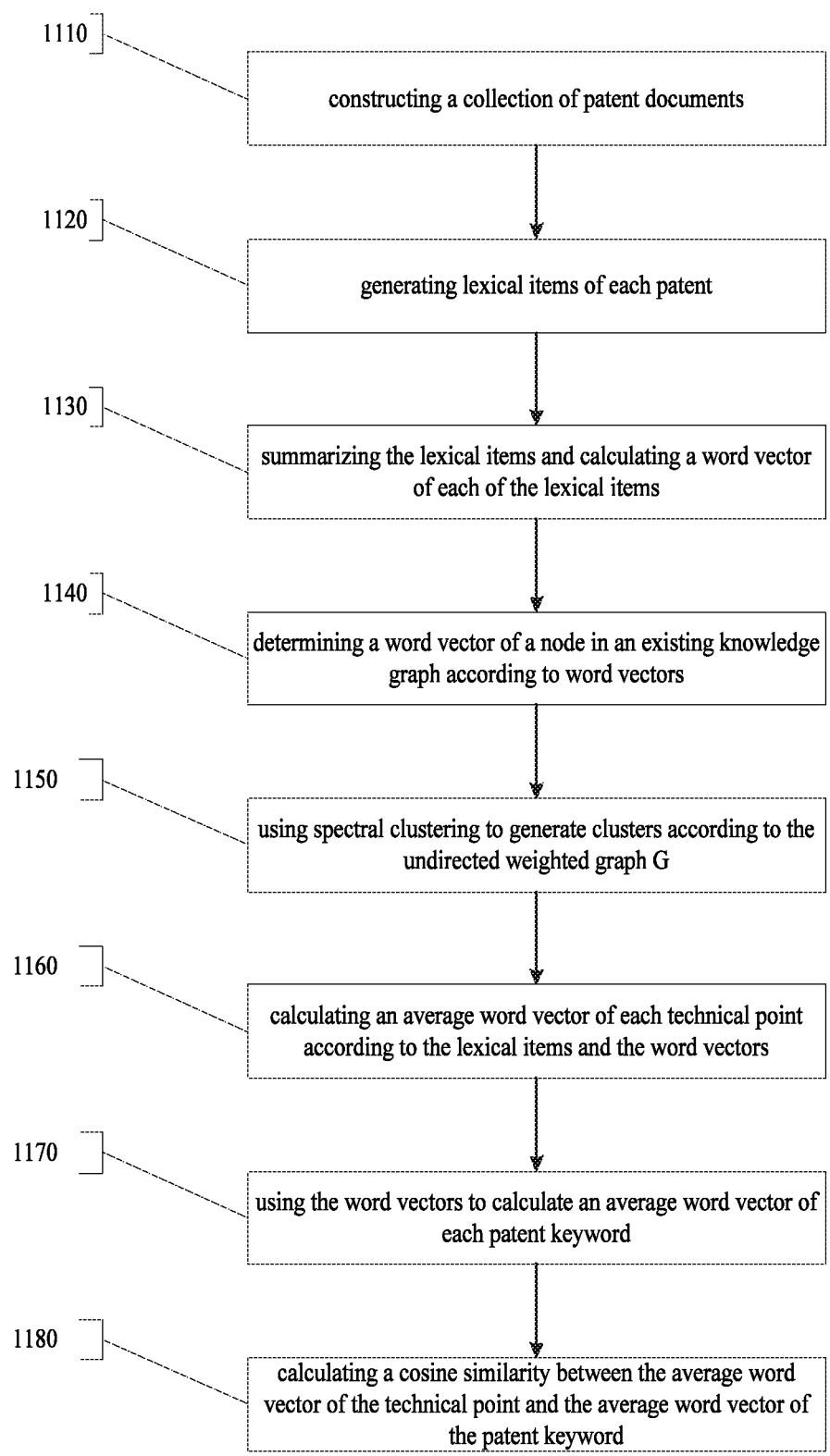
FIG. 1A is a flowchart of a technical point generating method of the embodiment shown in FIG. 1 of the patent evaluation method according to the present invention.
Figure 1B:
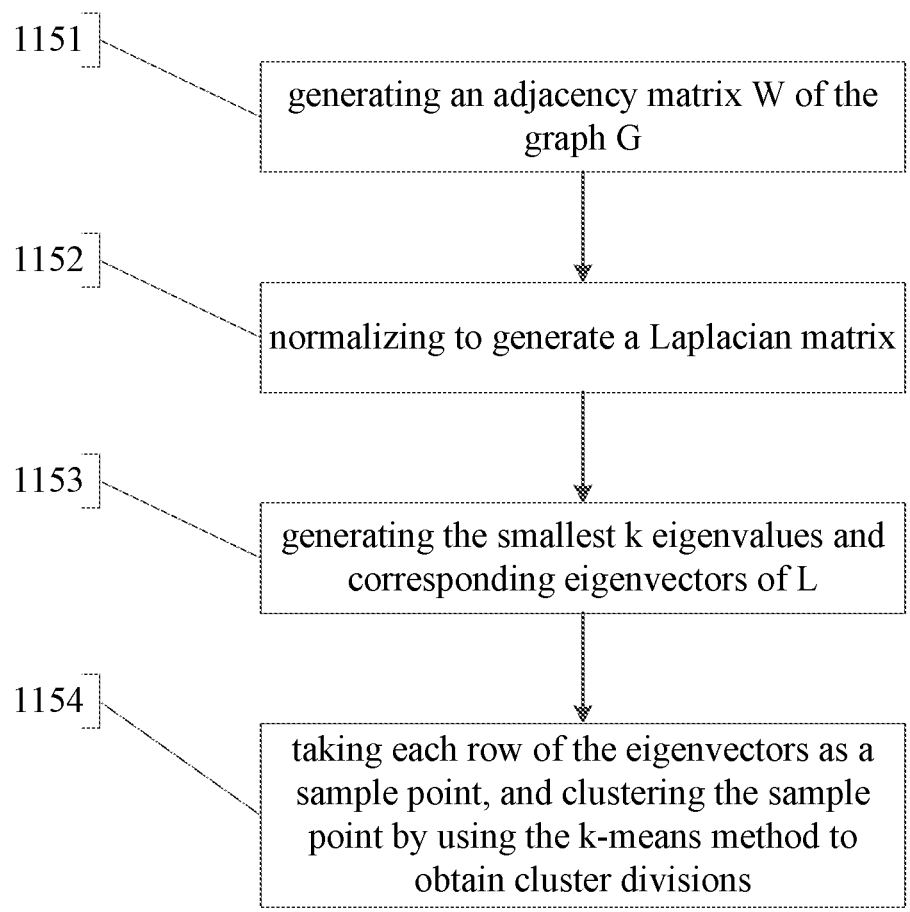
FIG. 1B is a flowchart of a technical point calculation method of the embodiment shown in FIG. 1 of the patent evaluation method according to the present invention.

Step 110 is executed. A technical point generating module 210 generates technical points and patent-affiliated technical points. As shown in FIG. 1A, step 1110 is executed, a collection of patent documents is constructed. Step 1120 is executed, lexical items of each patent is generated, the collection of patent documents is defined as C={$C_1$, $C_2$, ..., $C_n$}, any patent Ci in the collection of patent documents C is represented by space vectors of a set of keywords. First, an existing word segmentation system is used to perform Chinese word segmentation on all the patent documents to obtain the lexical items; and then to remove stop words in the patent documents according to a custom or public stop word database, wherein the stop words are function words without actual meanings. Step 1130 is executed, the lexical items are summarized and a word vector of each lexical item is calculated, and an occurrence probability of a current word is predicted according to words in context. A learning goal is to maximize the log-likelihood function, $$L = \sum_{\omega \in C} \log p(\omega | \text{Context}(\omega))$$

wherein ω represents any word in the patent documents C, p represents probability, p(ω|Context(ω)) represents probability under the Context(ω), and Context represents a context of the word. An iteration formula of the word vector of each word is as follows:

$$v(\tilde{\omega}) := v(\tilde{\omega}) + \eta \sum_{j=2}^{l^\omega} \frac{\partial L(\omega, j)}{\partial x_\omega}, \tilde{\omega} \in \text{Context}(\omega)$$

wherein x represents a word vector added by all of the word vectors of the word in the context, η represents a learning rate, $l^\omega$ represents the number of nodes, ∂ represents a partial derivative, $x_\omega$ represents an input of an input layer. Step 1140 is executed to determine a word vector of a node in an existing knowledge graph according to the word vectors, and to calculate a similarity between connected word vectors to generate an undirected weighted graph G, and calculate a cosine similarity between connected nodes. A calculation formula of the cosine similarity is $$\cos(\theta) = \frac{\sum_{i=1}^{n}(x_i \times y_i)}{\sqrt{\sum_{i=1}^{n}(x_i)^2} \times \sqrt{\sum_{i=1}^{n}(y_i)^2}}$$

wherein $x_i$, $y_i$ are the i-th element of the two word vectors respectively, and n is a dimension of the word vector. Step 1150 is executed to use spectral clustering to generate clusters which are the technical points according to the undirected weighted graph G. As shown in FIG. 1B, a calculation method of the technical point is to execute step 1151 to generate an adjacency matrix W of the graph G, where W is a symmetric matrix, and diagonal elements are 0. Step 1152 is executed to implement a normalization to generate a Laplacian matrix; the Laplacian matrix L=D−W satisfies $$L_{ij} = \begin{cases} \sum_{j=1}^{n} \omega_{ij} & i = j \\ -\omega_{ij} & i \neq j \end{cases}$$

wherein D is a diagonal matrix whose diagonal elements $d_i$ are a sum of elements of W rows or columns, $L_{ij}$ is an element in L, $\omega_{ij}$ is an element in W. Step 1153 is executed to generate the smallest k eigenvalues and corresponding eigenvectors of L. Step 1154 is executed to take each row of the eigenvectors as a sample point and cluster the sample point by using the k-means method to obtain cluster divisions. Step 1160 is executed to calculate an average word vector of each technical point according to the lexical items and the word vectors. Step 1170 is executed to select the most frequent T numbers of lexical items from the lexical items as patent keywords, and use the word vectors to calculate an average word vector of each patent keyword. Step 1180 is executed to calculate a cosine similarity between the average word vector of the technical point and the average word vector of the patent keyword.

Figure 1C:
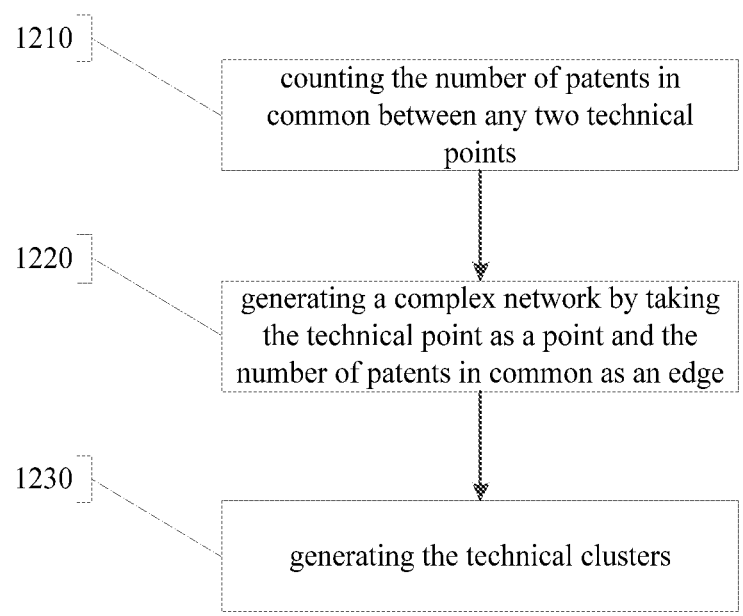
FIG. 1C is a flowchart of a technical cluster generating method of the embodiment shown in FIG. 1 of the patent evaluation method according to the present invention.

Step 120 is executed, and a cluster generating module 220 generates technical clusters and patent-affiliated clusters. As shown in FIG. 1C, step 1210 is executed to count the number of patents in common between any two technical points. Step 1220 is executed to generate a complex network by taking the technical point as a point and the number of patents in common as an edge. Step 1230 is executed to generate the technical clusters. In the step 120, the same method as in the step 110 will not be discussed separately.

Figure 1D:
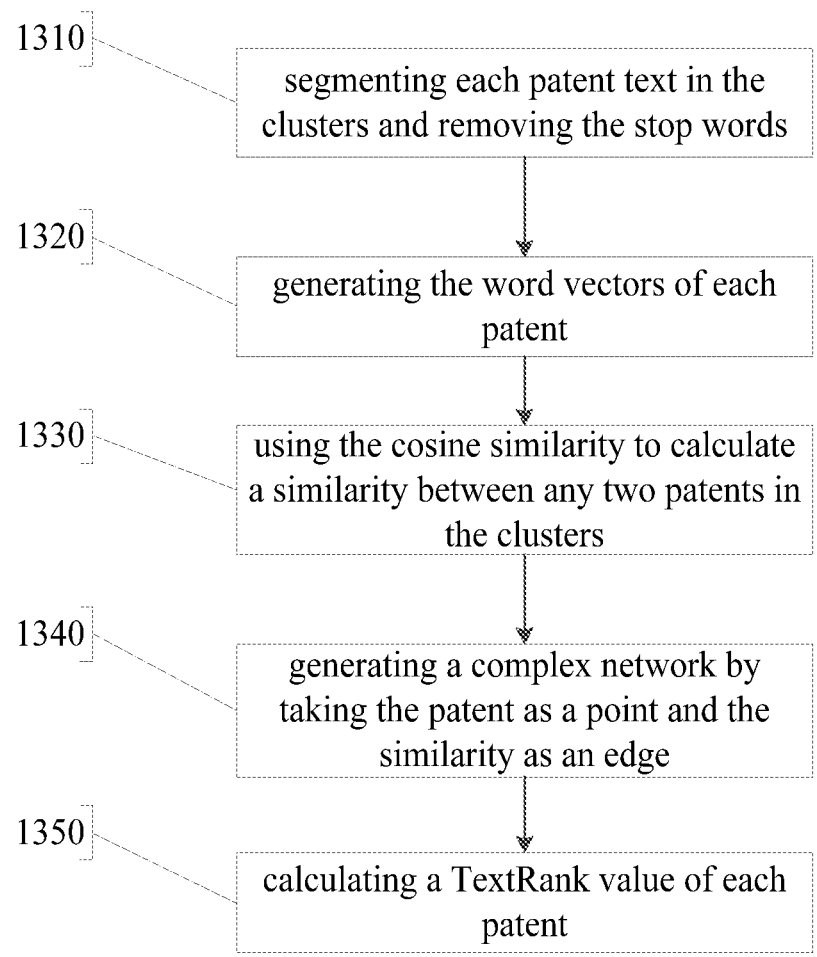
FIG. 1D is a flowchart of a patent evaluation method of the embodiment shown in FIG. 1 of the patent evaluation method according to the present invention.
Figure 1E:
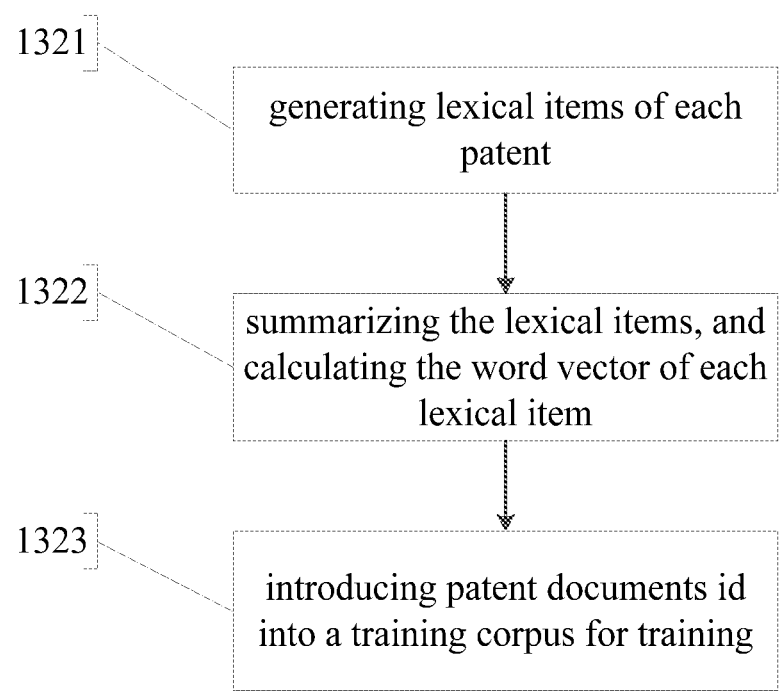
FIG. 1E is a flowchart of a patent word vector generating method of the embodiment shown in FIG. 1 of the patent evaluation method according to the present invention.

Step 130 is executed, and a patent evaluation module 230 performs patent evaluation in each of the technical clusters. As shown in FIG. 1D, step 1310 is executed to segment each patent text in the clusters and remove the stop words. As shown in FIG. 1E, step 1321 is executed to generate lexical items of each patent. Step 1322 is executed to summarize the lexical items, and calculate the word vector of each lexical item. Step 1323 is executed to introduce patent documents id into a training corpus for training. A method of the training includes: step A: initializing each patent document id and all the lexical items to form a K-dimensional vector−; step B: inputting the K-dimensional vector and the word vectors into a model, and accumulating these vectors by a hidden layer to obtain an intermediate vector as an input of an output layer softmax. Formulae of the training are $$f_t = \sigma_g(W_f x_t + U_f h_{t-1} + b_f)$$
$$i_t = \sigma_g(W_i x_t + U_i h_{t-1} + b_i)$$
$$o_t = \sigma_g(W_o x_t + U_o h_{t-1} + b_o)$$
$$c_t = f_t \circ c_{t-1} + i_t \circ \sigma_c(W_c t_t + U_c h_{t-1} + b_c)$$
$$h_t = o_t \circ \sigma_h(c_t)$$

wherein, f represents a forgotten activation vector, $\sigma_g$ is a sigmoid function, W, U and b are weight matrixes and deviation vector parameters that need to be learned during the training, x is an input vector of LSTM unit, t represents a time step, h represents an output vector of the LSTM unit, and i represents an activation vector of an input gate; o represents an activation vector of an output gate, c represents a cell state vector, $\sigma_c$ and $\sigma_h$ are hyperbolic tangent functions. Step 1320 is executed to generate the word vector of each patent. Step 1330 is executed to use the cosine similarity to calculate a similarity between any two patents in the clusters. Step 1340 is executed to generate a complex network by taking the patent as a point and the similarity as an edge. Step 1350 is executed to calculate a TextRank value of each patent. An iteration formula of the TextRank value is $$WS(V_i) = (1-d) + d \times \sum_{V_k \in In(V_i)} \frac{\omega_{ij}}{\sum_{V_k \in Out(V_j)} \omega_{jk}} WS(V_j)$$

wherein, $V_i$ and $V_j$ represent certain patents, $WS(V_i)$ represents a TextRank value of the patent $V_i$, d represents a damping coefficient, $In(V_i)$ represents a collection of patents which point to the patent $V_i$, $Out(V_j)$ represents a collection of patents which the patent $V_j$ pointed to, $WS(V_j)$ represents a TextRank value of the patent $V_j$. In the step 130, the same method as in the step 110 will not be discussed separately.

Embodiment 2

The advantages of the present invention are:
1. Get rid of the dependence on experts' evaluation samples, and have higher efficiency and lower cost.
2. The mining of patent information has risen from quantitative statistics to the information contained in text. Most of the information on patented technical attributes is expressed in text form, and the source of information is closer to the essence of patents.
3. Through technical clusters, patents with similar technologies are put together for evaluation. On the one hand, unnecessary calculations are reduced, and on the other hand, it is easier to dig out the advantages and disadvantages of technologies relative to similar technologies.

Figure 3:
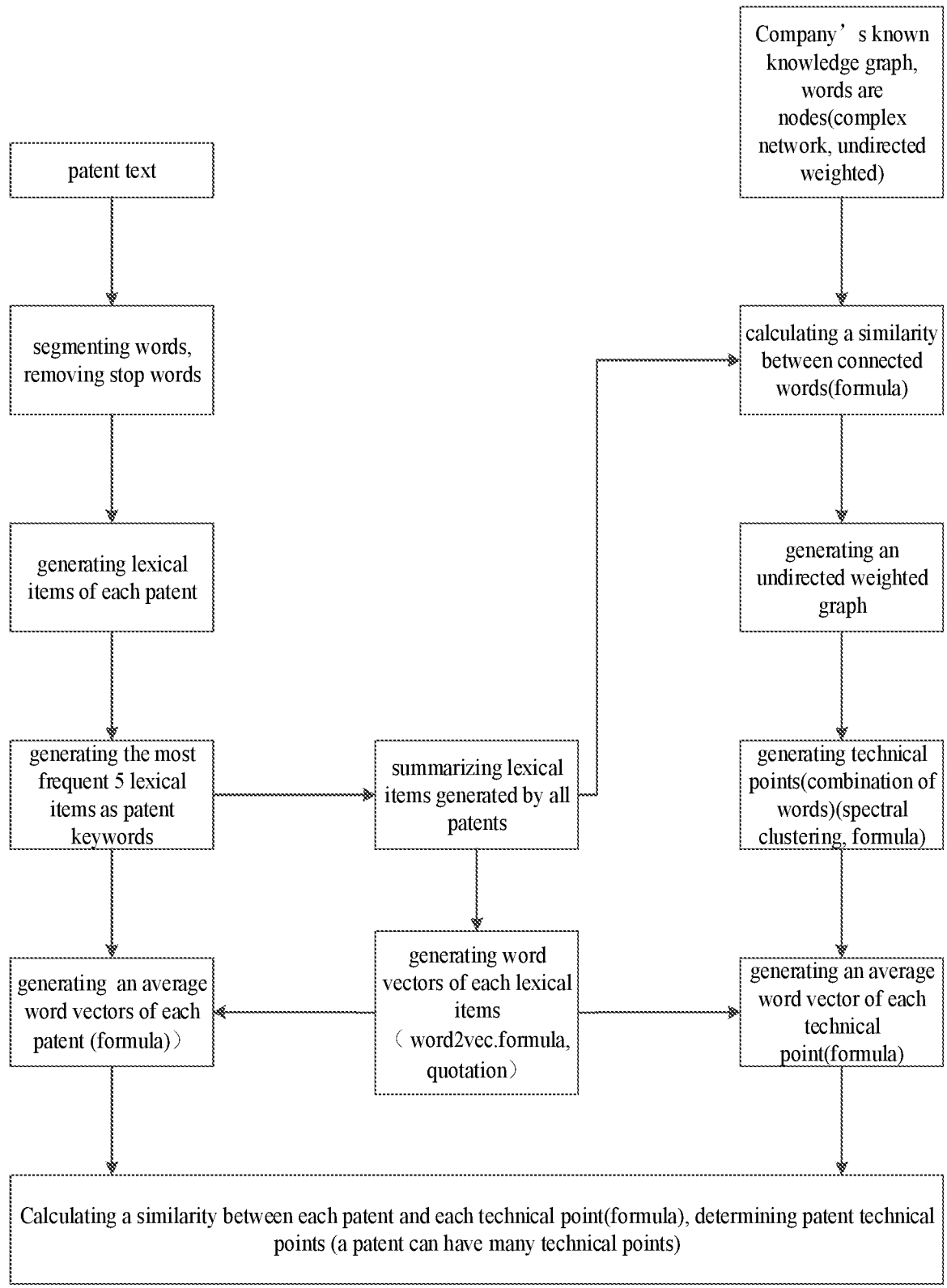
FIG. 3 is a flowchart of another preferred embodiment of the patent evaluation method according to the present invention.

As shown in FIG. 3, the first step is to generate technical points and patent-affiliated technical points.

Step 1: collecting patent documents and constructing a collection of patent documents;

Step 2: generating lexical items of each patent. A specific implementation method is to define the collection of patent documents as $C=\{C_1, C_2, \ldots, C_n\}$, any patent Ci in the collection of patent documents C is represented by a space vector of a set of keywords; a process of the implementation method is to first use an existing word segmentation system to perform Chinese word segmentation on all the patent documents to obtain the lexical items; and then to remove stop words in the patent documents according to a custom or public stop word database, wherein the stop words are function words without actual meanings.

Step 3: summarizing the lexical items generated in step the 2 and calculating a word vector of each of the lexical items. A specific implementation method is CBOW of word2vec, which predicts an occurrence probability of a current word according to words in context.

The learning goal is to maximize the log likelihood function:

$$L = \sum_{\omega \in C} \log p(\omega \mid \text{Context}(\omega))$$

wherein ω represents any word in the patent documents C, p represents probability, p(ω|Context(ω)) represents probability under the Context(ω), and Context represents a context of the word.

A Hierarchical Softmax method is used, an iteration formula of the word vector of each word is as follows:

$$v(\tilde{\omega}) := v(\tilde{\omega}) + \eta \sum_{j=2}^{j^{\omega}} \frac{\partial L(\omega, j)}{\partial x_{\omega}}, \tilde{\omega} \in \text{Context}(\omega)$$

wherein x represents a word vector added by all of the word vectors of the word in the context, η represents a learning rate, $l^\omega$ represents the number of nodes, ∂ represents a partial derivative, $x_\omega$ represents an input of an input layer.

Step 4: using the word vectors calculated in the step 3 to determine a word vector of a node (words are nodes) in an existing knowledge graph (if a word does not appear in step 2, the node is deleted), and calculate a cosine similarity between connected nodes, a calculation formula of the cosine similarity is $$\cos(\theta) = \frac{\sum_{i=1}^{n}(x_i \times y_i)}{\sqrt{\sum_{i=1}^{n}(x_i)^2} \times \sqrt{\sum_{i=1}^{n}(y_i)^2}}$$

wherein $x_i$, $y_i$ are the i-th element of the two word vectors respectively, and n is a dimension of the word vector.

Step 5: according to an undirected weighted graph G generated in the step 4, using spectral clustering to generate clusters (collection of points) which are the technical points. The calculation method is as follows:
1. generating an adjacency matrix W of the graph G, where W is a symmetric matrix, and diagonal elements are 0;
2. normalizing to generate a Laplacian matrix; the Laplacian matrix L=D−W satisfies $$L_{ij} = \begin{cases} \sum_{j=1}^{n} \omega_{ij} & i = j \\ -\omega_{ij} & i \neq j \end{cases}$$

wherein D is a diagonal matrix whose diagonal elements $d_i$ are a sum of elements of W rows or columns, $L_{ij}$ is an element in L, $\omega_{ij}$ is an element in W.
3. generating the smallest k eigenvalues and corresponding eigenvectors of L;
4. taking each row of the eigenvectors as a sample point, and clustering the sample point by using the k-means method to obtain cluster divisions.

Step 6: using words of the technical points obtained in the step 5 and the word vectors obtained in the step 3 to obtain an average value of word vectors of each technical point.

Step 7: selecting the most frequent 5 lexical items from the lexical items of each patent obtained in the step 2 as patent keywords, and using the word vectors obtained in the step 3 to calculate an average word vector of each patent keyword.

Step 8: calculating a cosine similarity between the average word vector of the technical point obtained in the step 6 and the average word vector of the patent keyword obtained in the step 7, and determining the patent-affiliated technical points with a combination that exceeds a threshold.

The second step is to generate technical clusters and patent-affiliated clusters.
  Step 1: counting the number of patents in common between any two technical points;
  step 2: generating a complex network by taking the technical point as a point and the number of patents in common as an edge;
  step 3: generating the technical clusters.

The third step is to perform a patent evaluation in each of the technical clusters.
  Step 1: segmenting each patent text in the clusters and removing the stop words;
  step 2: generating the word vectors of each patent;
  step 3: using the cosine similarity to calculate a similarity between any two patents in the clusters;
  step 4: generating a complex network by taking the patent as a point and the similarity as an edge;
  step 5: calculating a TextRank value of each patent.

Doc2vec:
A Distributed Memory version of Paragraph Vector (PV-DM) method is used to try to predict a probability of a word under the given context and paragraph vector.

A training method is similar to the CBOW in the first step-step 3, words obtained in the first step-step 2 and the vector obtained in the first step-step 3 are used, and then the patent documents id are introduced into the training corpus for training. First, each document ID and all the words obtained in the first step-step 2 are initialized to form a K-dimensional vector–, and then the document vector and the vector obtained in the first step-step 3 are inputted into a model, and a hidden layer accumulates these vectors to get an intermediate vector which is used as an input of the softmax of an output layer.

Doc2vec can also be replaced by a backward propagation of LSTM, formulae are $$f_t = \sigma_g(W_f x_t + U_f h_{t-1} + b_f)$$
$$i_t = \sigma_g(W_i x_t + U_i h_{t-1} + b_i)$$
$$o_t = \sigma_g(W_o x_t + U_o h_{t-1} + b_o)$$
$$c_t = f_t \circ c_{t-1} + i_t \circ \sigma_c(W_c t_t + U_c h_{t-1} + b_c)$$
$$h_t = o_t \circ \sigma_h(c_t)$$

wherein, f represents a forgotten activation vector, $\sigma_g$ is a sigmoid function, W, U and b are weight matrixes and deviation vector parameters that need to be learned during the training, x is an input vector of LSTM unit, t represents a time step, h represents an output vector of the LSTM unit, and i represents an activation vector of an input gate; o represents an activation vector of an output gate, c represents a cell state vector, $\sigma_c$ and $\sigma_h$ are hyperbolic tangent functions.

TextRank (TR):
An iteration formula is as follows:

$$WS(V_i) = (1 - d) + d \times \sum_{V_k \in In(V_i)} \frac{\omega_{ij}}{\sum_{V_k \in Out(V_j)} \omega_{jk}} WS(V_j)$$

wherein, $V_i$ and $V_j$ represent certain patents, $WS(V_i)$ represents a TextRank value of the patent $V_i$, d represents a damping coefficient, $ln(V_i)$ represents a collection of patents which point to the patent $V_i$, $Out(V_j)$ represents a collection of patents which the patent $V_j$ pointed to, $WS(V_j)$ represents a TextRank value of the patent $V_j$.

In order to better understand the present invention, the detailed description is made above in conjunction with the specific embodiments of the present invention, but it is not a limitation of the present invention. Any simple modification to the above embodiments based on the technical essence of the present invention still belongs to the scope of the technical solution of the present invention. Each embodiment in this specification focuses on differences from other embodiments, and the same or similar parts between the various embodiments can be referred to each other. As for the system embodiment, since it basically corresponds to the method embodiment, the description is relatively simple, and the relevant part can refer to the part of the description of the method embodiment.

What is claimed is:

1. A patent evaluation method, comprising collecting patent documents, further comprising:
    step 1: generating technical points and patent-affiliated technical points;
    step 2: generating technical clusters and patent-affiliated clusters;
    step 3: performing a patent evaluation in each of the technical clusters;
    wherein the step 1 comprises the following sub-steps:
    step 11: constructing a collection of the patent documents;
    step 12: generating lexical items of each patent of the collection;
    step 13: summarizing the lexical items and calculating word vectors of the lexical items;
    step 14: determining a word vector of a node in an existing knowledge graph according to the word vectors of the lexical items, and calculating a similarity between connected word vectors to generate an undirected weighted graph G;
    step 15: using spectral clustering to generate clusters according to the undirected weighted graph G, wherein the clusters are the technical points;
    step 16: calculating an average word vector of each of the technical points according to the lexical items and the word vectors of the lexical items;
    step 17: selecting the most frequent T numbers of lexical items from the lexical items as patent keywords, and using the word vectors to calculate an average word vector of each of the patent keywords; and
    step 18: calculating a cosine similarity between the average word vector of each of the technical points and the average word vector of each of the patent keywords.

2. The patent evaluation method according to claim 1, wherein an implementation method of the step 12 is to define the collection of the patent documents as C={$C_1$, $C_2$, ..., $C_n$}, and a patent $C_i$ in the collection of the patent documents C is represented by a space vector of a set of the patent keywords; a process of the implementation method is to first use an existing word segmentation system to perform Chinese word segmentation on the patent documents to obtain the lexical items; and then to remove stop words in the patent documents according to a custom or public stop word database, wherein the stop words are function words without actual meanings.

3. The patent evaluation method according to claim 2, wherein an implementation method of the step 13 is to predict an occurrence probability of a current word according to words in a context, and a learning goal is to maximize a log-likelihood function, $$L = \sum_{\omega \in C} \log p(\omega \,|\, Context(\omega))$$

wherein $\omega$ represents a word in the collection of the patent documents C, p represents the occurrence probability, $p(\omega|Context(\omega))$ represents a probability under the Context $(\omega)$, and Context represents a context of the word;
    an iteration formula of the word vector of each word is as follows:

$$v(\tilde{\omega}) := v(\tilde{\omega}) + \eta \sum_{j=2}^{l^\omega} \frac{\partial L(\omega, j)}{\partial x_\omega}, \tilde{\omega} \in Context(\omega)$$

wherein x represents a word vector added by word vectors of the words in the context, $\eta$ represents a learning rate, $l^\omega$ represents a number of nodes, $\partial$ represents a partial derivative, $x_\omega$ represents an input of an input layer.

4. The patent evaluation method according to claim 3, wherein the step 14 further comprises calculating a cosine similarity between connected nodes, a calculation formula of the cosine similarity between the connected nodes is $$\cos(\theta) = \frac{\sum_{i=1}^{n} (x_i \times y_i)}{\sqrt{\sum_{i=1}^{n} (x_i)^2} \times \sqrt{\sum_{i=1}^{n} (y_i)^2}}$$

wherein $x_i$, $y_i$ are i-th elements of two word vectors respectively, and n is a dimension of the two word vectors.

5. The patent evaluation method according to claim 4, wherein a calculation method of the technical points is as follows:
    step 151: generating an adjacency matrix W of the undirected weighted graph G, wherein the W is a symmetric matrix, and diagonal elements of the W are 0;
    step 152: normalizing the adjacency matrix W to generate a Laplacian matrix L;
    step 153: generating smallest k eigenvalues and corresponding eigenvectors of the Laplacian matrix L;
    step 154: taking each row of the eigenvectors as a sample point, and clustering the sample point by using a k-means method to obtain cluster divisions;

the Laplacian matrix L=D−W satisfies $$L_{ij} = \begin{cases} \sum_{j=1}^{n} \omega_{ij} & i = j \\ -\omega_{ij} & i \neq j \end{cases}$$

wherein D is a diagonal matrix, and diagonal elements $d_i$ of the diagonal matrix D are a sum of elements of W rows or columns, $L_{ij}$ is an element in the L, $\omega_{ij}$ is an element in the W.

6. The patent evaluation method according to claim 5, wherein the step 2 comprises the following sub-steps:
   step 21: counting a number of patents in common between two technical points of the technical points;
   step 22: generating a first complex network by taking the technical point as a point and the number of patents in common as an edge;
step 23: generating the technical clusters.
7. The patent evaluation method according to claim 6, wherein the step 3 comprises the following sub-steps:
   step 31: segmenting each patent text in the technical clusters and removing the stop words;
   step 32: generating word vectors of each patent;
   step 33: using a cosine similarity to calculate a similarity between two patents in the technical clusters;
   step 34: generating a second complex network by taking the each patent as a point and the similarity as an edge;
   step 35: calculating a TextRank value of the each patent;
   the step 32 comprises the following sub-steps:
   step 321: generating lexical items of each patent;
   step 322: summarizing the lexical items, and calculating word vectors of the lexical items;
step 323: introducing an id of each patent document of the patent documents into a training corpus for training;
   a method of the training comprises:
   step A: initializing the id of the each patent document and the lexical items to form a K-dimensional vector;
   step B: inputting the K-dimensional vector and the word vectors into a model, and accumulating the K-dimensional vector and the word vectors by a hidden layer to obtain an intermediate vector as an input of an output layer softmax;
   formulae of the training are $$f_t = \sigma_g(W_f x_t + U_f h_{t-1} + b_f)$$
$$i_t = \sigma_g(W_i x_t + U_i h_{t-1} + b_i)$$
$$o_t = \sigma_g(W_o x_t + U_o h_{t-1} + b_o)$$
$$c_t = f_t \circ c_{t-1} + i_t \circ \sigma_c(W_c x_t + U_c h_{t-1} + b_c)$$
$$h_t = o_t \circ \sigma_h(c_t)$$

wherein, f represents a forgotten activation vector, σg is a sigmoid function, W, U and b are weight matrices and deviation vector parameters to be learned during the training, x is an input vector of a long short-term memory (LSTM) unit, t represents a time step, h represents an output vector of the LSTM unit, and i represents an activation vector of an input gate; o represents an activation vector of an output gate, c represents a cell state vector, $\sigma_c$ and $\sigma_h$ are hyperbolic tangent functions;
an iteration formula of the TextRank value is $$WS(V_i) = (1-d) + d \times \sum_{V_k \in In(V_i)} \frac{\omega_{ij}}{\sum_{V_k \in Out(V_j)} \omega_{jk}} WS(V_j)$$

wherein, $V_i$ and $V_j$ represent predetermined patents, $WS(V_i)$ represents a TextRank value of the patent $V_i$, d represents a damping coefficient, $In(V_i)$ represents a collection of patents pointing to the patent $V_i$, $Out(V_j)$ represents a collection of patents which the patent $V_j$ pointed to, $WS(V_j)$ represents a TextRank value of the patent $V_j$.

* * * * *